Feb. 20, 1951   T. R. BRUNSON   2,541,983
TIMING DEVICE FOR ELECTRICAL CIRCUITS
Filed March 22, 1948   2 Sheets-Sheet 1
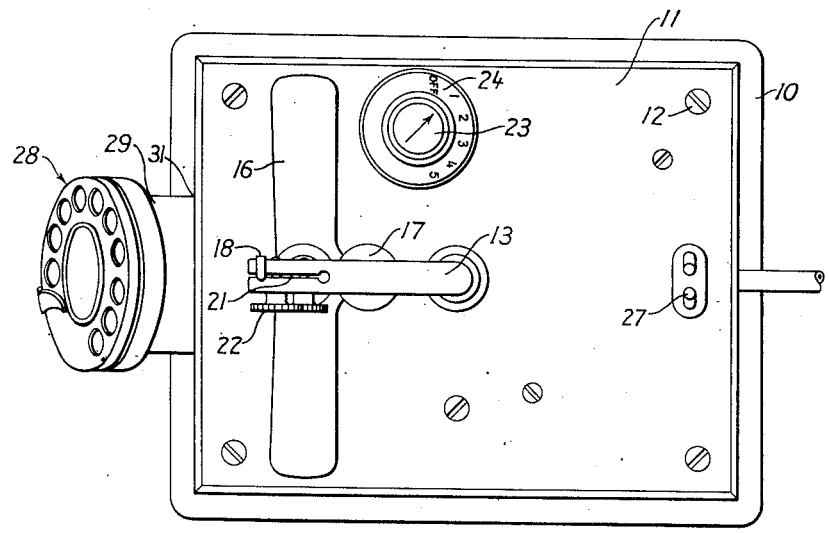
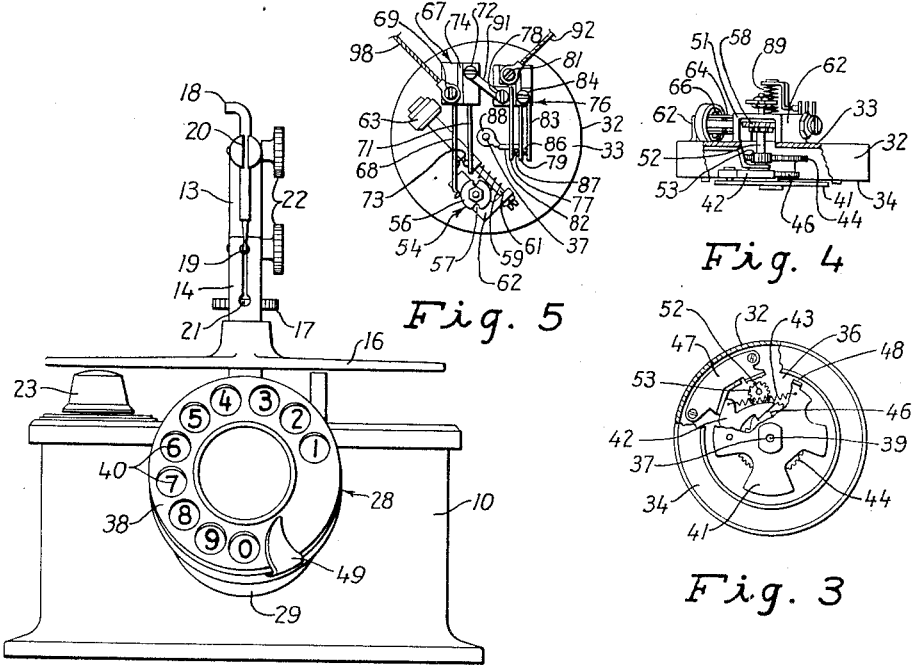
INVENTOR.
BY THAYER R. BRUNSON
ATTORNEY Feb. 20, 1951     T. R. BRUNSON     2,541,983
TIMING DEVICE FOR ELECTRICAL CIRCUITS
Filed March 22, 1948     2 Sheets-Sheet 2

INVENTOR.
BY THAYER R. BRUNSON
ATTORNEY.

Patented Feb. 20, 1951

2,541,983

UNITED STATES PATENT OFFICE 2,541,983

TIMING DEVICE FOR ELECTRICAL CIRCUITS

Thayer R. Brunson, Denver, Colo., assignor to Rocky Mountain Metal Products Company, Denver, Colo., a corporation of Colorado Application March 22, 1948, Serial No. 16,215

4 Claims. (Cl. 323—58)

This invention pertains to timing devices for electrical circuits, and is particularly adapted for use with spot welders and the like.

In spot welding operations it is desirable to control closely the intensity and duration of the welding current if uniform and satisfactory welds are to be obtained. The necessity for such control varies to some extent with the type and thickness of metal being welded, but is particularly critical in welding of stainless steel, such as a steel containing 18% chromium and 8% nickel. Various expedients have been proposed to obtain this desired control, as for example, the use of electronic timing circuits for controlling the primary transformer winding, and in some instances, the secondary winding. These have proved to be generally satisfactory in instances where a great number of welds are to be made on the same thickness of metal, such as stainless steel. However, these devices are inherently complex and costly, occupy considerable space and require skilled maintenance. Furthermore, adjustment of the cycle required for each change of metal thickness or type of metal is not as a rule quickly and easily made by a semi-skilled operator, thus confining such devices to a somewhat limited field.

A primary object of my invention is to overcome these and other difficulties in prior art devices by providing a simple, inexpensive, durable and flexible spot weld timing device, particularly useful, for example, in the construction of stainless steel orthodontic appliances and similar devices wherein various thicknesses of metal are frequently encountered.

Speed of operation and reproducibility of results, as well as flexibility and accuracy of control by semi-skilled operators, are, of course, also essential to the efficient operation of such devices, the attainment thereof constituting a further important object of my invention.

Other objects will be found in various novel components and the arrangement of parts as will become apparent from the following description and from the appended drawings in which:

Fig. 1 is a plan view of a small spot welding device incorporating my timer,

Fig. 2 is an end elevation of the device shown in Fig. 1,

Figures 7, 8:
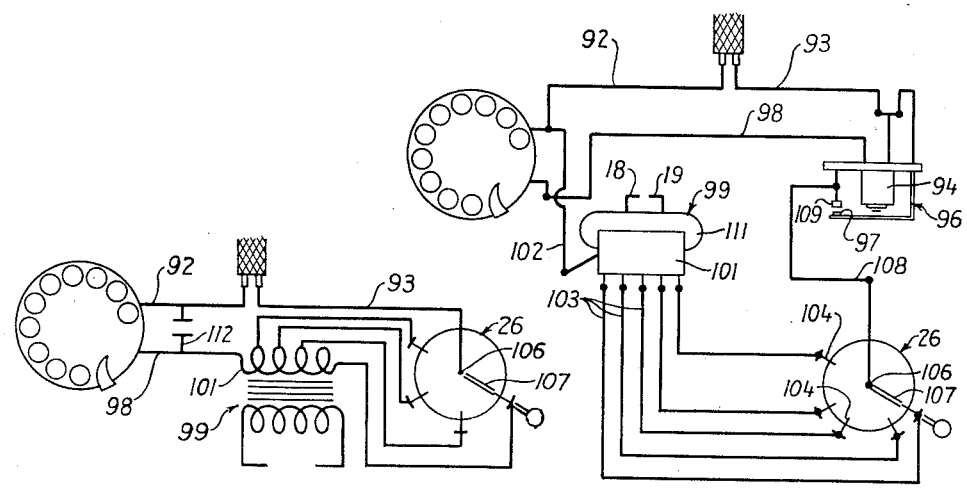
Figure 6:
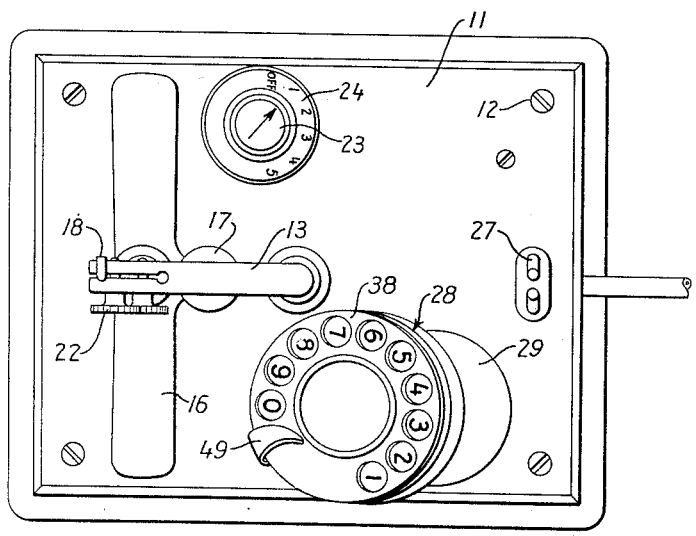

Fig. 3 is a partially sectioned front view of my timing device with the selector dial removed, Fig. 4 is a partially sectioned elevation of the device shown in Fig. 3, Fig. 5 is a plan view of the rear face of my timing device, Fig. 6 is a plan view of a modified form of welding apparatus incorporating my invention, Fig. 7 is a diagrammatic illustration of a welding circuit, and Fig. 8 is a diagrammatic illustration of a modified form of welding circuit.

For illustrative purposes the following description is specifically directed to a small bench-type welder such as those employed in the construction of orthodontic appliances, since my invention is particularly adapted for use in connection with such welders; but it should be understood that the principles herein disclosed are applicable with little modification to larger welding machines and similar mechanisms.

Referring to Figs. 1 and 2, I have shown a spot welder comprising a generaly rectangular box 10 having a cover 11, of insulating material such as Bakelite, secured to the box 10 by screws 12. An L-shaped upper electrode support 13 is secured to the top 11, projecting upwardly and towards the front of the box 10. A lower electrode support 14 having laterally extending arms 16 is reciprocally mounted in an opening extending through the top 11 and is urged upwardly by a spring (not shown), the pressure of which may be regulated by a knurled screw 17. An upper electrode 18, and a lower electrode 19 are secured respectively in alignment to the upper and lower electrode supports 13 and 14 which are split as at 20 and 21 to receive the electrodes. Knurled screws 22 may be provided on the electrode supports to clamp the electrodes in place and to permit vertical adjustment. A tap switch control knob 23 and a graduated dial 24 are also provided, the former being secured to the shaft of the tap switch, generally designated 26. A pair of fixed annealing electrodes 27 may also be mounted on the top 11 and suitably connected to a source of electric current for annealing welded strips of metal.

A selector or timer, generally designated 28 is secured to the front of the box 10, as in Figs. 1 or 2, or to the top 11 as in Fig. 3, in any desired manner, as for example by screws, and includes a tube 29 having an inclined end surface 31 adapted to dispose the face of the selector 28 at a suitable angle for convenient operation.

The selector 28 includes a hollow cylindrical housing 32 having a rear face 33 and a front face 34 defining an opening 36 communicating with the interior of the housing 32. An axial main shaft 37 is rotatably mounted in the rear face 33 and extends outwardly through the housing 32 to approximately the plane of the front face 34, as well as projecting rearwardly through the rear face 33 for some distance. The outer end of the main shaft 37 is keyed to receive a selector dial 38 having an axially disposed mating opening and a plurality of equally spaced peripheral openings 40, the latter, when the selector dial 38 is is at rest, revealing numerals or other indicia inscribed on the front face 34 directly beneath the selector dial 38. The selector dial 38 may be secured to the main shaft 37 by a suitable screw engaging threaded opening 39 formed in the outer end of the main shaft 37.

A member 41 is also keyed to the outer end of the main shaft 37 beneath the selector dial 38 and pivotly supports a pawl 42 which is urged inwardly by a spring 43 secured at one end to the pawl 42 and at the other end to the member 41. A main gear 44 is rotatably mounted over the main shaft 37 and includes a ratchet 46 formed integrally therewith, the ratchet being disposed for engagement by the pawl 42. A stop member 47 is secured within the cylindrical housing 32 and shaped to contact the pawl 42 to prevent rotation of the main shaft 37 and the member 41 in a counter clockwise direction beyond a predetermined point. The member 41 may be provided with a projection 48 also disposed to engage the other side of the stop member 47 to limit the rotation of the member 41 in a clockwise direction (Fig. 3). The stop member 47 may also include an index finger 49 extending upwardly through the housing and inwardly towards the main shaft 37 over the selector dial 38.

The rear face 33 of the housing 32 has a rearwardly projecting open-sided arch member 51 formed integrally therewith which rotatably supports a countershaft 52, the outer end of the counter 52 being journaled in the stop member 47. A portion of the countershaft 52, adjacent the stop member 47, is provided with a gear 53 secured to the countershaft 52 within the housing 32. The opposite end of the countershaft 52 projects rearwardly through the arch member 51 and is secured to a cam 54, preferably of insulating material, which may suitably have opposed similar lobes 56 separated by notches 57. A worm wheel 58 is also secured to the countershaft 32 immediately below the arch member 51 and engages a worm 59 formed on a governor shaft 61 journaled in bosses 62 formed integrally with the housing 32 and projecting rearwardly from the rear face 33. A hollow cylindrical governor race 63 is secured to one of the bosses 62 and is concentric with governor shaft 61. Spring arms 64 are secured at one end to approximately the middle portion of the governor shaft 61 and are provided at their opposite ends with outwardly facing friction members 66 disposed within the governor races 63. The angle of the teeth of the worm wheel 58 and of the worm 59 is such that as the countershaft 52 is rotated the governor shaft 61 will be driven by the worm wheel 58 through the worm 59, thus forcing the friction members 66 on the free ends of the spring arms 64 outwardly into frictional engagement with the governor race 63 thereby limiting the speed of both countershaft 52 and the main shaft 37.

A normally closed spring contact generally designated 67 is secured to the rear face 33 of the housing and includes a spring arm 68, having a binding screw 69; and a fixed arm 71, having a binding screw 72; each arm having aligned contact points 73. The arms 68 and 71 are fixed at one end and are insulated from each other, as well as from the housing, by a block 74 of insulating material. The notches 57 on the cam 54 are of sufficient size to receive the free or follower end of the spring arm 68, which bears against the edge of the cam, thus allowing the arm to move to the right, as in Fig. 5, to bring the contact points 73 into engagement with each other each time the arm 68 is forced into a notch 57. The position of the cam 54 on the countershaft 52 is adjusted in such manner that the end of the spring arm 68 will rest upon one of the lobes 56 when the pawl 43 is in contact with the stop member 47 and the selector dial 38 is in its furthest counterclockwise position, thereby holding the contacts 73 open when the cam 54 is not in motion.

I also provide a three-armed switch 76, providing an inner fixed arm 77, having a binding screw 78', a spring arm 79, having a binding screw 81 and a pin 82 projecting through an opening formed in a fixed arm 77, and an outer fixed arm 83, having a binding screw 84. Each of these arms are secured at one end to the housing 32 and insulated from each other as well as from the housing. Aligned contact points 86 are provided on the outer face of the spring arm 79 and the inner face of the outer fixed arm 73, similar aligned contact points 87 being provided on the inner face of the spring arm 79 and the outer face of the inner fixed arm 77. The spring arm 79 is formed in such manner that it normally tends to close the contact points 87 and establish a circuit between the binding screws 81 and 78. However, a cam arm 88 is secured to the projecting inner end of the main shaft 37 and fixed in position to engage the pin 82 when the pawl 42 is against the stop 47, thus holding the contact points 87 open and closing the contact points 86. The main shaft 37 is driven in a counterclockwise direction by a main spring 89, telescoped over the projecting inner end of the main shaft below the cam arm 88, with one end of the spring engaging the cam arm and the other end engaging the housing 32. A link 91 is secured to the binding screws 78 and 72, completing a circuit between the inner fixed arm 77 of the switch 76 and the inner fixed arm 71 of the switch 67, thereby connecting the switches 67 and 76 in series.

As shown in Fig. 7, a wire 92 from suitable power source may be connected to binding screws 81, another power wire 93 being connected to a coil 94 of a relay, generally designated 96, and to a relay contact 97. A wire 98 connects the relay coil 94 to binding screw 69 of the selector thus establishing the selector in series with the coil 94 of relay 96. A transformer generally designated 99 includes a primary winding 101 connected by wire 102 to the power wire 92 and having a plurality of tap wires 103, each of which is in turn connected to peripheral contacts 104 on the tap switch 26. The tap switch is provided with a rotatable shaft 106 projecting upwardly through the top 11 and engaging the tap switch control knob 23 as well as with an arm 107 disposed to selectively engage one of the contacts 104 upon rotation of the knob 23. The arm 107 is connected by a wire 108 to a contact point 109 on the relay 96, said point mating with contact point 97. The transformer 98 is also provided with a secondary winding 111 which is connected to the upper and lower electrodes 18 and 19.

In operation the power wires 92 and 93 are connected to a suitable source of power, such as 110 volt 60 cycle A. C., and the tap switch 26 set at a selected point engaging one of the contacts 104. The material to be welded, such as two strips of thin stainless steel, is then placed between the electrodes 18 and 19 and is held in position by the upward pressure of the lower electrode support 14. During this operation the circuit is broken by the normally open relay 96, the switch 76 and the switch 67. The operator then inserts a finger in one of the peripheral openings in the selector dial 38 and rotates the selector dial in a clockwise direction until the finger engages the index member 49, thus rotating the selector dial through a predetermined distance. Rotation of the selector dial 38 rotates the main shaft 37, driving the pawl 42 around the ratchet 46, but does not move the main gear 44 or rotate the cam 54. The same movement also rotates the cam arm 88 out of engagement with the pin 82, permitting the contact points 87 to close the circuit between wire 92 and the fixed arm 71 of the switch 67. At this stage the relay 96 is still open and the main spring 89 is wound ready to drive the main shaft 37 in a counter-clockwise direction. The operator then releases the selector dial 38 allowing the spring to rotate the main shaft and selector dial counter-clockwise until the pawl 42 engages the stop member 47. As the dial 38 is released the pawl 42 is urged inwardly into engagement with the ratchet 46 by the spring 43, thereby driving the main gear 44 in a counter-clockwise direction as in Fig. 3. The main gear 44 drives the countershaft gear 53, rotating the countershaft 52, the cam 54 and the worm wheel 58. Since the worm wheel 58 meshes with the governor shaft 61 the speed with which the main spring 89 can return the parts to their initial position is held constant. As the cam 54 rotates, the follower end of the spring arm 68 will slip into and out of the notches 57 of the cam 54 allowing the contact points 73 to close momentarily, completing the circuit through coil 94 of the relay 96, thus closing the relay and completing the circuit through the primary winding 101. Completion of the circuit through the primary 101 induces a corresponding current in the secondary winding 111 which is transmitted directly to the electrodes 18 and 19 and the work between the electrodes. As the cam arm 88 returns to position it will in its last few degrees of revolution engage the pin 82 and open the contact points 87, thus insuring an opening of the circuit at the completion of each operation.

Since the speed of rotation of the cam 54 is held constant by the governor, the pulses of current in the circuit through the relay coil 94, the primary winding 101 and the secondary winding 111 will be of equal duration. The number of pulses in each operation is, of course, obviously determined by the length of movement of the selector dial 38 in a clockwise direction by the operator, who also determines the current intensity by the setting of the tap switch 26. Therefore, the total energy delivered to the electrodes 18 and 19 during each operation is reproducibly controlled by the operator and similar settings of the tap switch and selector dial will deliver the same quantity of total energy to the electrodes. Minor changes in material thickness or compensation for other factors such as a change in the material being welded may be easily compensated by increasing or decreasing the movement of the selector dial by the operator, thus imparting a high degree of flexibility to the spot welder without sacrificing reproducibility of results. This is particularly advantageous in instances where several different thicknesses of metal strips aree frequently presented for welding. The precise setting of the tap switch and the number of degrees of rotation of the selector dial 38 may be standardized for each operation and when utilized by the operator will yield uniformly excellent reproducible results. The precise shape and number of notches on cam 54 may of course be varied within wide limits without difficulty.

If the current passing through the primary winding 101 is not excessive, a circuit such as that illustrated in Fig. 8 may be employed wherein the selector 28 is connected directly in series with the primary 101 of the transformer and the relay 96 eliminated. In this circuit the power wire 93 is connected to the arm 107 of the tap switch 26. Power wire 92 is secured to binding screw 81 in the selector 28 and the wire 98 connected to primary 101 of the transformer 99. The switches 67 and 76 of the selector 28 are therefore in series with the primary 101 and operation of the selector 28 will send the pulses of current through the contact points 73 into the circuit. In this circuit, however, I prefer to connect a condenser 112 between the wires 92 and 98 to prevent arcing between the contact points 73, 79, and 87, it being understood, of course, that separate condensers may be connected across each of said contact points if desired. This circuit, although requiring an excellent grade of contact point material as well as relatively large contact points, is inexpensive to construct and simple to maintain.

In compliance with R. S. 4888 I have described in detail a specific embodiment of my invention but it is not to be understood that I thereby limit myself to the precise details disclosed, since obviously the principles are applicable to large spot welders and other devices requiring accurate control of time. My invention is therefore to be construed broadly except insofar as limited by appended claims.

I claim:

1. In an electrical energizing system comprising a main circuit for providing a source of power, a first parallel circuit, said parallel circuit having in series circuit arrangement a transformer primary winding, a plurality of taps connected to said primary winding at spaced turns thereof, a switch member for selectively completing a circuit through one of said taps, and a relay actuated switch; a second parallel circuit, said second parallel circuit having in series circuit arrangement two sets of contacts, and a coil for actuating the relay switch in said first parallel circuit; a dial selector for operating said sets of contacts, a transformer secondary formed on the same core with said primary, and leads connected to the opposite ends of said secondary for energizing electrical apparatus when the dial selector is operated to close said contacts.

2. In an electrical energizing system comprising a main circuit for providing a source of power, a first parallel circuit, said parallel circuit having in series circuit arrangement a transformer primary winding, a plurality of taps connected to said primary winding at spaced turns thereof, a switch member for selectively completing a circuit through one of said taps, and a relay actuated switch; a second parallel circuit, said second parallel circuit having in series circuit arrangement two sets of contacts, and a coil for actuating the relay switch in said first parallel circuit, a dial selector for operating said contacts, said selector having a cam for closing one set of said contacts a predeterminable number of times as desired by the operator, and a second cam in said selector for holding the second set of said contacts open while said selector is at rest and for closing said second contacts during the operation of said selector, a transformer secondary formed on the same core with said primary, and leads connected to the opposite ends of said secondary for energizing electrical apparatus when the dial selector is operated to close said contacts.

3. In an electrical energizing system comprising a main circuit for providing a source of power, a first parallel circuit, said parallel circuit having in series circuit arrangement a transformer primary winding, a plurality of taps connected to said primary winding at spaced turns thereof, a switch member for selectively completing a circuit through one of said taps, and a relay actuated switch; a second parallel circuit, said second parallel circuit having in series circuit arrangement two sets of normally closed spring contacts and a coil for actuating the relay switch in said first parallel circuit, a cam for opening and closing one set of the contacts, means for driving the cam at a constant speed, a rotatable selector for determining the number of revolutions of the cam for each separate operation, means rotated by the selector for holding the other set of said contacts open when the selector is at rest, a transformer secondary formed unitarily with said primary, and leads connected to the opposite ends of said secondary for energizing electrical apparatus when said contacts are closed by operation of said cams.

4. In an electrical energizing system comprising a main circuit for providing a source of power, a first parallel circuit, said parallel circuit having in series circuit arrangement a transformer primary winding, a plurality of taps connected to said primary winding at spaced turns thereof, a switch member for selectively completing a circuit through one of said taps, and a relay actuated switch; a second parallel circuit, said second parallel circuit having in series circuit arrangement, first and second sets of spring contacts and a coil for actuating the relay switch in said first parallel circuit, a transformer secondary formed on the same core with said primary, leads connected to the opposite ends of said secondary, first and second cams for operating said sets of contacts, ratchet means for driving the first cam at a substantially constant speed, a selector movable between limits to a plurality of positions and including a member engageable with the ratchet, and means for driving the selector in one direction, said selector being connected to the second cam whereby the circuit through the second set of contacts is closed by the first portion of movement of the selector from rest to effectually close the circuit through said actuating coil and primary windings whereby the said secondary leads are energized.

THAYER R. BRUNSON.

REFERENCES CITED

The following references are of record in the file of this patent:

UNITED STATES PATENTS

| Number | Name | Date |
| --- | --- | --- |
| 2,009,647 | Brusse et al. | July 30, 1935 |
| 2,034,275 | Tarbox | Mar. 17, 1936 |
| 2,122,613 | Koca | July 5, 1938 |
| 2,144,033 | Root | Jan. 17, 1939 |
| 2,233,177 | Murray et al. | Feb. 25, 1941 |
| 2,241,157 | Powell | May 6, 1941 |
| 2,277,146 | Roby | Mar. 24, 1942 |
| 2,448,865 | Crombach | Sept. 7, 1948 |